(12) United States Patent
Kleinewegen

(10) Patent No.: US 9,638,263 B2
(45) Date of Patent: May 2, 2017

(54) CLAW COUPLING

(71) Applicant: SIEMENS AKTIENGESELLSCHAFT, München (DE)

(72) Inventor: Stefan Kleinewegen, Bocholt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/142,678

(22) Filed: Apr. 29, 2016

(65) Prior Publication Data

US 2016/0319884 A1 Nov. 3, 2016

(30) Foreign Application Priority Data

Apr. 30, 2015 (EP) .................................... 15001279

(51) Int. Cl.
*F16D 3/68* (2006.01)
*F16D 3/50* (2006.01)

(52) U.S. Cl.
CPC ........ *F16D 3/50* (2013.01); *F16D 3/68* (2013.01)

(58) Field of Classification Search
CPC ..... F16D 3/50; F16D 3/56; F16D 3/58; F16D 3/64; F16D 3/68; F16D 3/74; F16D 3/78
USPC ..... 464/73–76, 82, 83, 87, 89, 90, 158, 159, 464/92–96
See application file for complete search history.

(56) References Cited

U.S. PATENT DOCUMENTS

| | | | | |
|---|---|---|---|---|
| 2,025,829 | A * | 12/1935 | Ricefield | F16D 3/68 464/73 |
| 2,034,001 | A * | 3/1936 | Ricefield | F16D 3/68 464/73 |
| 2,616,273 | A * | 11/1952 | Pringle | F16D 3/68 464/73 |
| 7,387,574 | B2 * | 6/2008 | Zimmermann | F16D 3/68 464/73 |
| 7,883,423 | B2 * | 2/2011 | Kubota | F16D 3/68 464/73 |

(Continued)

FOREIGN PATENT DOCUMENTS

| | | |
|---|---|---|
| DE | 6930649 U | 11/1969 |
| DE | 1939410 A1 * | 2/1971 ............... F16D 3/68 |

(Continued)

*Primary Examiner* — Josh Skroupa
(74) *Attorney, Agent, or Firm* — Henry M. Feiereisen LLC.

(57) ABSTRACT

A claw coupling includes two coupling elements having claws which engage alternately into one another and have confronting concave claw surfaces configured to follow a first circular track. Disposed between the coupling elements is a pressure body arrangement having pressure bodies respectively received between the claws of one coupling element and the claws of the other coupling element. The pressure bodies have convex pressure body surfaces which engage during a torque transmission with the claw surfaces of the claws. Each pressure body surface is configured to follow a second circular track, with the radius of the first circular track and the radius of the second circular track touching one another at a radially innermost point of the claw surface which is disposed on a common straight line having a center point of the first circular track and a center point of the second circular track.

8 Claims, 4 Drawing Sheets

(56) References Cited

U.S. PATENT DOCUMENTS

| | | | | |
|---|---|---|---|---|
| 8,602,154 B2 * | 12/2013 | Iwasa | ........................ | F16D 3/68 |
| | | | | 464/73 |
| 2008/0064506 A1 * | 3/2008 | Lin | ........................ | F16D 3/68 |
| | | | | 464/73 |
| 2012/0208649 A1 * | 8/2012 | Nakagawa | ................ | F16D 3/68 |
| | | | | 464/73 |

FOREIGN PATENT DOCUMENTS

| | | | | | |
|---|---|---|---|---|---|
| DE | 2153411 | A1 | | 5/1973 | |
| DE | 2211512 | A1 | * | 10/1973 | ............... F16D 3/68 |
| DE | 2706034 | A1 | | 8/1978 | |
| DE | 2841178 | A1 | * | 3/1980 | ............... F16D 3/68 |
| DE | 19919696 | A1 | | 5/2000 | |
| GB | 691638 | A | * | 5/1953 | ............... F16D 3/68 |
| GB | 2105440 | A | * | 3/1983 | ............... F16D 3/68 |

\* cited by examiner

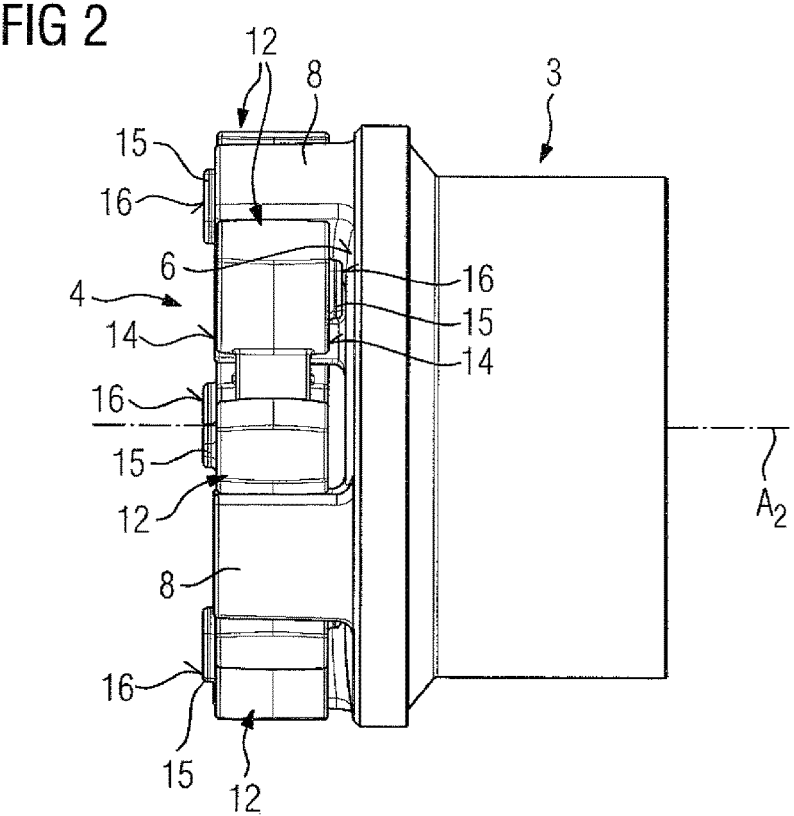
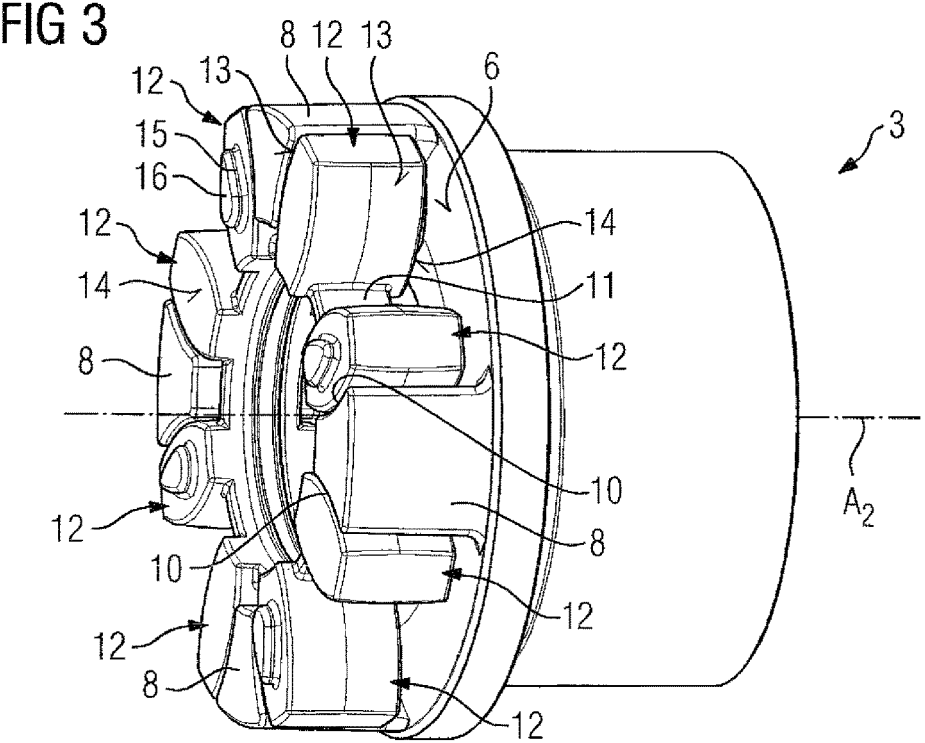

CLAW COUPLING

CROSS-REFERENCES TO RELATED APPLICATIONS

This application claims the priority of European Patent Application, Serial No. 15001279.7, filed Apr. 30, 2015, pursuant to 35 U.S.C. 119(a)-(d), the disclosure(s) of which is/are incorporated herein by reference in its entirety as if fully set forth herein.

BACKGROUND OF THE INVENTION

The present invention relates to a claw coupling.

The following discussion of related art is provided to assist the reader in understanding the advantages of the invention, and is not to be construed as an admission that this related art is prior art to this invention.

Claw couplings can find application to transmit a torque between two shafts aligning with one another, such as between a motor shaft and a transmission shaft for example, and include two coupling elements disposed axially opposite one another, having end face surfaces facing towards one another, from which claws engaging alternately into one another project, and a pressure body arrangement disposed between the coupling elements and made of elastic material. The pressure body arrangement includes a ring element and pressure bodies projecting radially outwards from the ring element, which are each received between a claw of one coupling element and a claw of the other coupling element. During operation, the two coupling elements turn relative to one another in accordance with the torque present and the stiffness of the elastic material of the pressure body arrangement. Each claw of the coupling elements executes hereby a rotational movement, with a point of a side surface of a claw disposed radially further out moving on a greater circular track than a point of a side surface of a claw disposed radially further inwards and thereby covering a greater distance. With claw couplings in which the claw surfaces and the pressure body surfaces have curvatures corresponding to one another, this leads to each pressure body being pressed together more on the outside than on the inside, which results in an uneven pressure distribution, in which a higher edge pressure acts radially outwards. Accordingly the pressure bodies are pushed radially inwards during the operation of the claw coupling, which frequently results in a significant deformation of the pressure body arrangement, by which the ring element in particular is effected.

Attempts have been made to prevent this deformation of a pressure body arrangement by limiting the maximum permissible torque of a claw coupling. In this way impermissibly high forces directed inwards acting on the pressure bodies can be prevented, through which a deformation of the ring element of the pressure body ring may be counteracted. The maximum permissible torque is mostly to be set very low here, however, which in many cases is not desirable. Another approach involves replacing the ring element of the pressure body ring by a circular washer, in order to lend a greater stiffness to the arrangement in the radial direction. A drawback of this approach to configure the pressure body arrangement resides in the fact that a shaft can then no longer project into the claw coupling, thereby restricting construction. A further approach involves of selecting the curvatures of the claw surfaces and pressure body surfaces such that the two curvatures each follow a circular track, with the radius of the circular track of the curvatures of the pressure body surfaces being smaller than that of the claw surfaces. As a result, the size of the contact surface between a pressure body surface and an assigned claw surface varying as a function of the torque transmitted by the claw coupling. Accordingly the edge pressing acting on the pressure body can be adjusted by a suitable selection of the radii of curvature of the claw and pressure body surfaces in relation to a rated torque of the claw coupling to be transmitted such that, at the rated torque, comparatively low forces directed radially inwards act on the ring element. However a problem with this approach is that a suitable choice of the respective radii of curvature always involves a series of individual calculations and/or trials, which is associated with very great effort and high costs.

It would therefore be desirable and advantageous to provide an improved claw coupling to obviate prior art shortcomings

SUMMARY OF THE INVENTION

According to one aspect of the present invention, a claw coupling includes two coupling elements disposed axially opposite one another and having end face surfaces which face towards one another and from which claws project and engage alternately into one another, the claws disposed on corresponding circular rings and having confronting concave curved claw surfaces, each claw surface having a curvature configured to follow a first circular track defined by a radius, and a pressure body arrangement disposed between the coupling elements and made of elastic material, the pressure body arrangement including a ring element and pressure bodies which project radially outwards from the ring element and are respectively received between the claws of one of the coupling elements and the claws of the other one of the coupling elements, the pressure bodies having convex curved pressure body surfaces which engage during a torque transmission with the claw surfaces of the claws, each pressure body surface having a curvature configured to follow a second circular track defined by a radius that is smaller than the radius of the first circular track, wherein the radius of the first circular track of the claw surface and the radius of the second circular track of the pressure body surface touching one another at a radially innermost point of the claw surface, said radially innermost point of the claw surface being disposed on a common straight line having a center point of the first circular track and a center point of the second circular track.

Investigations have revealed that these specific geometrical parameters always lead to an optimized force distribution at the individual pressure bodies of the pressure body arrangement in the rated torque range of the claw coupling, in which the radial forces acting radially inwards and outwards on the ring element of the pressure body arrangement to a large extent compensate for one another, through which deformations of the ring element of the pressure body arrangement are prevented in the rated torque range. In addition extensive calculations and/or trials do not have to be performed in advance for a design of the coupling elements and the pressure body arrangement in accordance with these specific geometrical parameters, which enables the inventive claw coupling to be constructed and manufactured in a simple and low-cost manner.

According to another advantageous feature of the present invention, the center point of the second circular track can be disposed on a radial center line of the ring element. Advantageously, the center point of the second circular track can be disposed at an intersection point of a radial center line of the ring element and a center pitch circle of the claws. The radius of the central pitch circle of the claws in this case is defined as half the sum of the inner and outer radius of the claws. Particularly good results are achieved with such a choice of the center point of the second circular track.

According to another advantageous feature of the present invention, the curvature of pressure body surfaces of neighboring pressure bodies facing away from one another can be disposed on a common circular track. Accordingly, the pressure body surfaces can be manufactured in a simple and cost-effective way.

According to another advantageous feature of the present invention, some of the pressure bodies can each be provided with at least one axially projecting spacer having a contact surface in engagement with the end face surface of the coupling elements when a torque is transmitted. During transmission of a torque from one coupling element to another coupling element, the pressure bodies of the pressure body ring are deformed such that the end face surfaces of the respective pressure bodies with the spacers disposed on said surfaces bulge out, until the contact surfaces of the spacers, when a predefined torque is exceeded, come into engagement with the end face surfaces of the coupling elements. With a further increase in the torque the contact surfaces are then pressed against the contact surface areas, through which adhesion forces are created, which likewise counteract forces acting radially inwards on the ring element of the pressure body arrangement.

According to another advantageous feature of the present invention, each pressure body can be provided with at least one spacer. This is advantageous to the extent that forces occurring are distributed evenly over the pressure body arrangement.

According to another advantageous feature of the present invention, the spacer of one of the pressure bodies and the spacer of an adjacent one of the pressure bodies can be configured to project axially in opposite directions. This configuration also contributes to an even force distribution.

According to another advantageous feature of the present invention, each pressure body can be provided with at least two spacers, which project in opposite directions.

According to another advantageous feature of the present invention, the claw surfaces can be made by a casting process. Thus, there is no need for a mechanical refinishing. On one hand, this has the advantage that manufacturing the coupling elements is associated with low costs. In addition greater adhesion forces are achieved during contact between a pressure body and a cast claw surface than during contact with a machined claw surface, thereby contributing to a compensation of forces acting radially inwards.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a side view of a coupling element of the claw coupling of FIG. 1, on which a pressure body ring is held;

FIG. 3 is a perspective part view of the coupling element of FIG. 2;

DETAILED DESCRIPTION OF PREFERRED EMBODIMENTS

Figure 1:
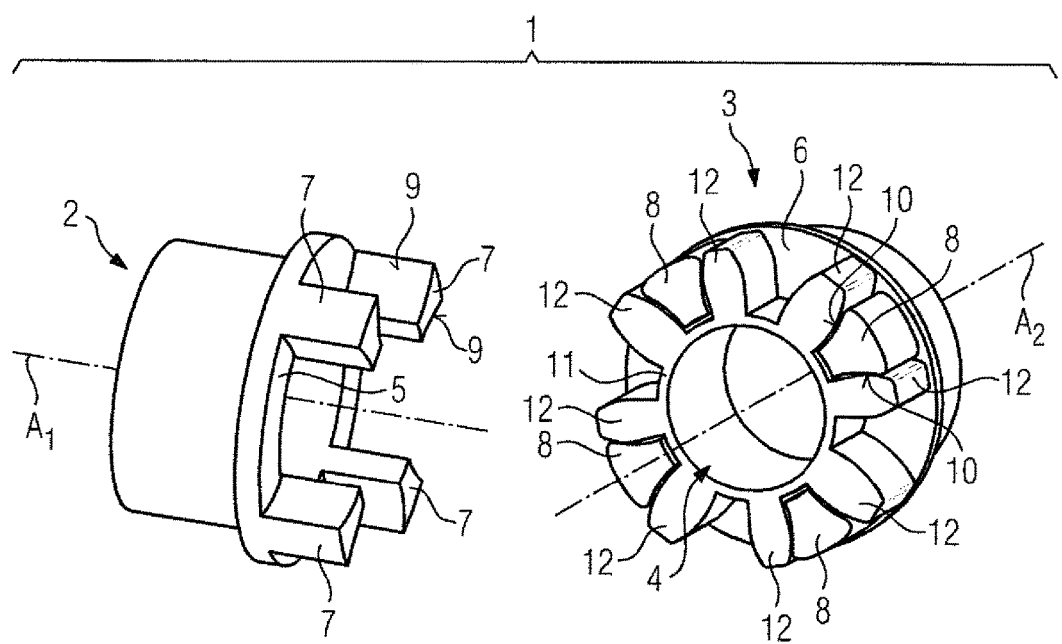
FIG. 1 is a perspective view of one embodiment of a claw coupling according to the present invention in a partly-assembled state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of one embodiment of a claw coupling according to the present invention, generally designated by reference numeral 1 and depicted in a partly-assembled state. The claw coupling 1 serves to transmit torque between two shafts aligned with one another and comprises as it main components two coupling elements 2, 3 disposed axially opposite one another when assembled according to specification with aligning longitudinal axes $A_1$, $A_2$ as well as a pressure body arrangement 4 disposed between the coupling elements 2, 3.

The two coupling elements 2 and 3, which involve castings, have end face surfaces 5 and 6 facing towards each other, from which alternately engaging claws 7 and 8 project, which are each disposed on circular rings corresponding to one another, wherein in the present case each coupling element 2, 3 has four claws 7, 8. Adjacently arranged claws 7 and 8 of the coupling elements 2 and 3 define hereby a receiving space between them, which is delimited in the circumferential direction by concave curved claw surfaces 9 and 10 of the claws 7 and 8 of the coupling elements 2 and 3 facing towards one another. The claw surfaces 9, 10 involve cast surfaces that do not have to be mechanically refinished.

Figure 4:
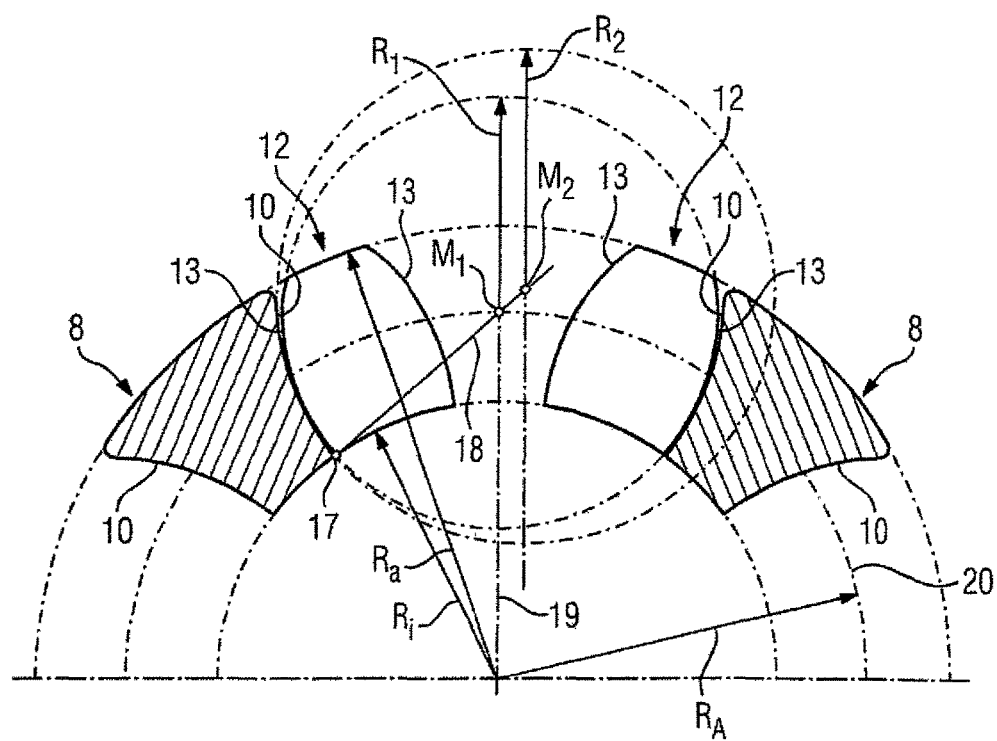
FIG. 4 is a front view of a detail of the coupling element of FIG. 2.

The pressure body arrangement 4 is made from elastic material and includes a ring element 11 as well as eight pressure bodies 12 projecting radially outwards from the ring element 11, with the ring element 11 and the pressure bodies 12 being made in one piece in the present example. The pressure bodies 12 include pressure body surfaces 13 that are curved in a convex shape, as readily apparent from FIG. 4. As shown in FIGS. 2 and 3, showing in detail the coupling element 3, each pressure body 12 is provided on its opposite end face surfaces 14 with an axially projecting spacer 15, which defines a contact surface 16 embodied elongated in an oval shape, wherein the spacers 15 of neighboring pressure bodies 12 each project axially in opposing directions.

The concave curved claw surfaces 10, 11 of the claws 7, 8 of the coupling elements 2, 3 each have a curvature that follows a first circular track with a first radius $R_1$. The convex curved pressure body surfaces have a curvature that in each case follows a second circular track with a second radius $R_2$, wherein the second radius $R_2$ of the second circular track is smaller than the first radius $R_1$ of the first circular track. In this case, the radius $R_1$ of the first circular track of a claw surface 9 and the radius $R_2$ of the second circular track of a pressure body surface 13 engaging with this claw surface 9 touch each other at the radially innermost point 17 of the claw surface 9. Furthermore, this radially innermost point 17 of the claw surface 9 is disposed on a common straight line 18 with the center point $M_1$ of the first circular track and the center point $M_2$ of the second circular track. The center point $M_2$ of the second circular track in this case is positioned on a radial center line 19 of the ring element 11, and specifically at the intersection point of the radial center line 19 of the ring element 11 and a center pitch circle 20 of the claws 8. The radius $R_t$ of the center pitch circle is defined in this case as half of the sum of the claw outer radius $R_a$ and of the claw inner radius $R_i$, i.e. $R_t=0.5 (R_a+R_i)$. Furthermore the curvatures of pressure body surfaces 13 of adjacent pressure bodies 12 facing away from one another are disposed on a common circular track.

During operation of the claw coupling 1, a torque is transmitted between the coupling elements 2, 3 via the pressure body arrangement 4. While at low torque, as a result of the previously described specific geometrical embodiment of the claw surfaces 9, 10 of the claws 7, 8 and the pressure body surfaces 13, a sickle-shaped gap with a gap dimension increasing constantly radially outwards remains, the pressure body surfaces 13 rest completely on the assigned claw surfaces 9, 10 after around 5% of the rated torque is reached, so that the absolute pressure ratio A/I between a point A lying radially outwards and a point I lying radially inwards of the respective pressure body surfaces rises suddenly, see section a of the curve 21 in FIG. 5, which represents the graph of the absolute pressure ratio in relation to the torque transmitted with the inventive claw coupling 1. As the torque increases further the absolute pressure ratio continues to increase in section b with a less steep slope, since the forces between the claw surfaces 9, 10 and the pressure body surfaces 13 are increasing radially outwards, which is supported by the fact a very good friction adhesion is present between the claw surfaces 9, 10 manufactured by casting and the pressure body surfaces 13. Furthermore, the pressure body 12 is deformed as the moment of torque increases such that its end face surfaces 14 bulge out, so that the contact surfaces 16 of the spacers 15 are pressed against the end face surfaces 5, 6 of the coupling elements 2, 3 while creating an increasing retaining force. On reaching the rated torque $D_{rated}$ the pressure ratio $D_{rated}$ then assumes approximately the value 1, which is shown by the straight line 22. In other words, on reaching the rated torque $D_{rated}$ the forces acting radially inwards and radially outwards on the ring element 11 compensate for each other, so that the ring element is not deformed.

Figure 5:
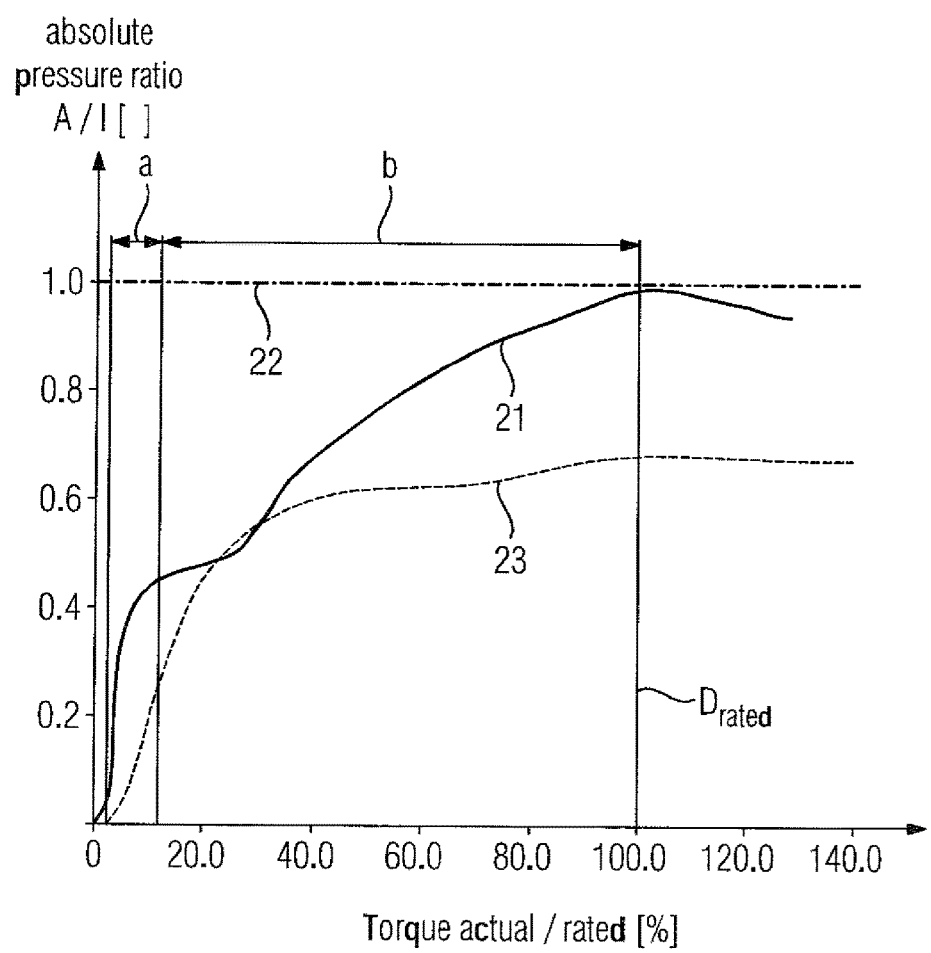
FIG. 5 is a diagram showing pressure ratios at pressure body surfaces during the operation of the claw coupling shown in FIG. 1.

The curve 23 in FIG. 5 shows the graph of the pressure ratio for increasing torque of a conventional claw coupling. When curves 21 and 23 are compared, the advantage of the inventive embodiment of the claw coupling 1 by comparison with a conventional claw coupling becomes evident, which is attributable in large part to the previously described specific geometrical parameters of the arrangement and curvature of the claw and pressure body surfaces.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. For example, the number of claws and pressure bodies can vary. Number and positioning of the spacers is also variable.

What is claimed as new and desired to be protected by Letters Patent is set forth in the appended claims and includes equivalents of the elements recited therein:

1. A claw coupling, comprising:
   two coupling elements disposed axially opposite one another and having end face surfaces which face towards one another and from which claws project and engage alternately into one another, said claws disposed on corresponding circular rings and having confronting concave curved claw surfaces, each said claw surface having a curvature configured to follow a first circular track defined by a radius; and
   a pressure body arrangement disposed between the coupling elements and made of elastic material, said pressure body arrangement including a ring element and pressure bodies which project radially outwards from the ring element and are respectively received between the claws of one of the coupling elements and the claws of the other one of the coupling elements, said pressure bodies having convex curved pressure body surfaces which engage during a torque transmission with the claw surfaces of the claws, each said pressure body surface having a curvature configured to follow a second circular track defined by a radius that is smaller than the radius of the first circular track,
   the radius of the first circular track of the claw surface and the radius of the second circular track of the pressure body surface touching one another at a radially innermost point of the claw surface, said radially innermost point of the claw surface being disposed on a common straight line having a center point of the first circular track and a center point of the second circular track.

2. The claw coupling of claim 1, wherein the center point of the second circular track is disposed on a radial center line of the ring element.

3. The claw coupling of claim 1, wherein the center point of the second circular track is disposed at an intersection point of a radial center line of the ring element and a center pitch circle of the claws.

4. The claw coupling of claim 1, wherein the curvature of pressure body surfaces of neighboring pressure bodies facing away from one another are disposed on a common circular track.

5. The claw coupling of claim 1, wherein some of the pressure bodies are each provided with at least one axially projecting spacer having a contact surface in engagement with the end face surface of the coupling elements when a torque is transmitted.

6. The claw coupling of claim 1, wherein each pressure body is provided with at least one axially projecting spacer having a contact surface in engagement with the end face surface of the coupling elements when a torque is transmitted.

7. The claw coupling of claim 6, wherein the spacer of one of the pressure bodies and the spacer of an adjacent one of the pressure bodies are configured to project axially in opposite directions.

8. The claw coupling of claim 1, wherein the claw surfaces are made by a casting process.

* * * * *